April 17, 1962     S. H. BREWER ETAL     3,029,699
WIDE ANGLE LENS SYSTEM
Filed May 25, 1959
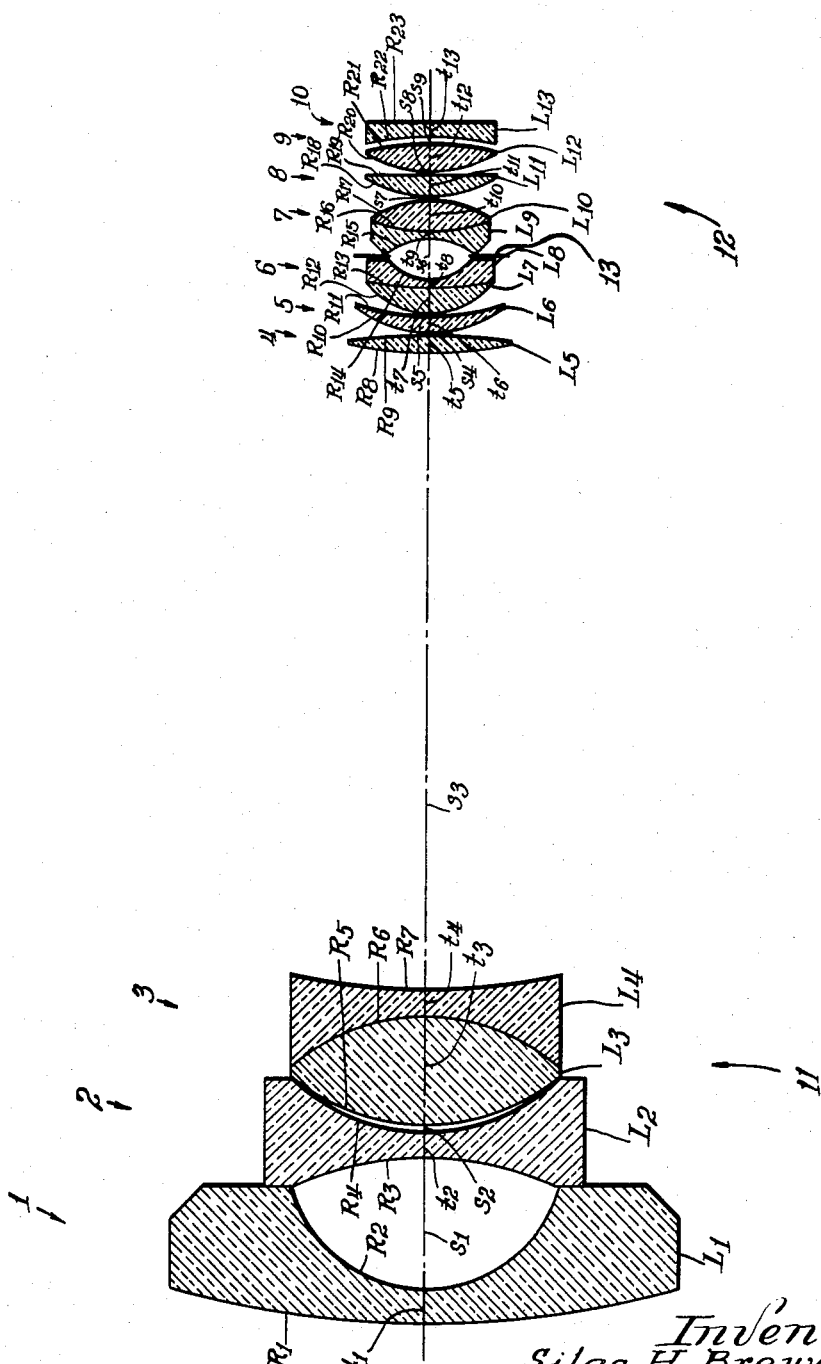
Inventors:
Silas H. Brewer,
Thomas I. Harris and
By Irving C. Sandback
Robert F. Miehle, Atty.

3,029,699
WIDE ANGLE LENS SYSTEM
Silas H. Brewer, Los Angeles, Calif., and Thomas I. Harris, Mundelein, and Irving C. Sandback, Morton Grove, Ill., assignors to Bell & Howell Company, Chicago, Ill., a corporation of Illinois
Filed May 25, 1959, Ser. No. 815,445
4 Claims. (Cl. 88—57)

This invention relates to a lens system, and more particularly to a highly corrected, very wide angle optical objective.

An object of the invention is to provide a highly corrected objective capable of forming sharp images from an angle of view of as great as one hundred fifty degrees.

Another object of the invention is to provide a wide angle lens system of the inverted telephoto type in which a positive rear lens group is preceded a substantial distance by a negative front positive lens group having a front strongly negative meniscus and a second negative lens forming with the front meniscus a biconvex air lens predominantly convex toward the front. The front lens group also may include a rear achromatized positive meniscus doublet and the rear group may include a positive lens and an adjacent negative lens forming a meniscus air lens concave to the front and of substantially uniform thickness to substantially completely eliminate spherical aberration.

Another object of the invention is to provide a wide angle lens system having a front negative meniscus and a second biconcave component forming an air lens predominantly convex to the front followed by a rear positive lens group having an intermediate stop and negative compound menisci bracketing the stop.

A further object of the invention is to provide an extremely wide angle photographic lens in which a very large degree of barrel distortion is present in the image for the purpose of providing greater uniformity of illumination of the image.

It is to be understood that the terms "front" and "rear" as herein used refer to the ends of the objective respectively nearer the longer and shorter conjugates thereof.

A better understanding of the invention may be obtained from the following detailed description of lens systems forming specific embodiments thereof, when read in conjunction with the appended drawings, in which the single figure is a longitudinal section of a lens system forming one embodiment of the invention.

The invention provides a lens system of the wide angle type having a front negative lens group and a rear positive lens group. The front lens group may include a front strongly negative meniscus singlet followed by a biconcave singlet forming with the front meniscus singlet an air lens predominantly convex to the front. The front lens group may be spaced closely to the rear lens group or may be spaced a substantial distance therefrom in which latter construction the front lens group includes an achromatized positive meniscus doublet. The rear lens group may include an internal stop with compound negative meniscus bracketing the stop and positive components outside these menisci. The rear portion of the rear lens group may have a biconcave singlet predominantly concave forwardly along with a biconvex singlet spaced in front thereof predominantly convex forwardly and forming with the rear singlet an air lens of substantially uniform thickness. In order to decrease fall off of illumination proceeding outwardly from the axis of the image, the objective may have a large amount of barrel distortion deliberately introduced thereinto, and, for viewing purposes projected back through an objective having similar distorting properties to remove tse distortion in the projected image.

In the drawing, there is shown a highly corrected, extreme wide angle objective of the inverted telephoto type wherein a front negative lens group 11 consisting of components 1, 2 and 3 is spaced relatively far from a rear positive lens group 12 consisting of components 4 to 10. Proceeding from front to rear, the objective includes the components 1 to 10 composed of lenses $L_1$ to $L_{13}$ having radii of curvature of the spherical surfaces thereof $R_1$ to $R_{23}$, axial thicknesses $t_1$ to $t_{13}$ and axial separations $s_1$ to $s_9$. The rear lens group has an internal stop 13.

The front lens group includes the lenses $L_1$ to $L_4$, of which the lens $L_1$ is a strongly negative meniscus singlet concave to the rear. The lens $L_2$ is a biconcave singlet predominantly concave to the rear and in edge contact with lens $L_1$. The lens $L_2$ forms a biconvex air lens with lens $L_1$. This air lens is predominantly convex forwardly. The variation of the lens $L_1$ from extreme thickness at the edge of the field to extreme thinness at the center together with the exactly reverse dimensions of the air lens therebehind provides a very large entrance pupil to substantially eliminate vignetting and also obviate the $\cos^4$ law, which is very important due to the very wide angular coverage in the lens system or objective being described. Under the $\cos^4$ law, illumination of the image falls off as the fourth power of the distance from the optical axis. It has been found that by the introduction of barrel distortion into the objective, this fall off in illumination is reduced, and, in the objective being described, a large amount of barrel distortion is deliberately incorporated into the objective so that the effect of the $\cos^4$ law is greatly lessened.

The lenses $L_3$ and $L_4$ form the component 3 which is achromatized and is shown as a cemented doublet but also may be of an air spaced doublet, of course. The component 3 forms a triplet with the lens $L_2$, and achromatized the front lens group to minimize chromatic variation which is necessary because of the long space between the front and rear lens groups and the extreme coverage angle. The components 2 and 3 with the curves $R_4$ and $R_5$ balance out astigmatic field variations.

The lens system shown in the drawing is highly corrected, except for distortion, and has a very wide angle of view of about one hundred fifty degrees or greater and produces a small image at the focal or film plane behind the rear lens group and provides uniform illumination throughout the image. To keep the small image size and maintain the lens system corrected for one hundred fifty degrees or greater coverage, an extremely high percentage of distortion is designed into the lens system. This distortion is about sixty-four percent for a field of view of one hundred forty degrees and is about seventy percent for coverage of one hundred fifty degrees.

As described above, by the very large oblique entrance pupil of the front lens group, vignetting is eliminated and the $\cos^4$ law effects are substantially eliminated. However, the enlarged entrance pupil tends to introduce large amounts of spherical aberration at the entrance pupil which is minimized by the air lens between the lenses $L_1$ and $L_2$.

For high correction, the front lens group 11 should comply with the following inequalities in which $F_1$ is the equivalent focal length of the front component 11:

$$\infty < \frac{R_1}{F_1} < -3.000$$

$$-3.000 < \frac{R_2}{F_1} < -.400$$

$$\infty < \frac{R_3}{F_1} < +.400$$

$$-5.000 < \frac{R_4}{F_1} < -.5000$$

$$-6.000 < \frac{R_5}{F_1} < -.400$$

$$+.500 < \frac{R_6}{F_1} < +3.000$$

$$-1.000 < \frac{F_1}{R_7} < +.5000$$

$$-.050 < -\frac{t_1}{F_1} < -1.000$$

$$.200 < -\frac{s_1}{F_1} < 4.000$$

$$.040 < -\frac{t_2}{F_1} < 1.000$$

$$0 < -\frac{s_2}{F_1} < .200$$

$$.200 < -\frac{t_3}{F_1} < 2.000$$

$$0 < \frac{s_3}{F_1} < .200$$

$$.040 < -\frac{t_4}{F_1} < .500$$

$$.500 < -\frac{s_4}{F_1} < 25.000$$

The rear lens group 12 is generally symmetrical and has a front portion in front of the stop 13 and including a biconvex front singlet $L_5$, a second positive meniscus singlet $L_6$ concave to the stop, and a rear negative meniscus doublet $L_7$ and $L_8$ concave to the stop and in compound form shown as cemented but also capable of being of the edge contact type. The rear portion of the rear lens group 12 is behind the stop 13, and has a front negative meniscus doublet consisting of the biconcave lens $L_9$ and the biconvex lens $L_{10}$ cemented thereto but which may be in edge contact therewith. Proceeding rearwardly from the component 7, the group 12 includes the second lens $L_{11}$, which is a biconvex singlet predominantly convex forwardly, the third lens $L_{12}$, which is a biconvex singlet also having its most convex surface forwardly, and the rear lens $L_{13}$ which is a biconcave singlet predominantly concave forwardly. The lens $L_{13}$ is spaced somewhat from the lens $L_{12}$, and the surfaces $R_{21}$ and $R_{22}$ form an air lens therebetween of substantially uniform thickness. The air lens substantially eliminates higher order spherical aberration. To effect this control over the higher order spherical aberration, the objective must comply with the following inequalities where $F_2$ is the equivalent focal length of the rear lens group 12:

$$.60 < \frac{R_{21}}{R_{22}} < 1.67$$

$$0 < -\frac{s_9}{F_2} < .150$$

For a high degree of correction of the aberrations, except for distortion which is deliberately made high, the rear lens group should comply with the following inequalities:

$$+2.000 < \frac{R_8}{F_2} < +\infty$$

$$\infty < \frac{R_9}{F_2} < -4.000$$

$$.700 < \frac{R_{10}}{F_2} < +2.000$$

$$.900 < \frac{R_{11}}{F_2} < +3.000$$

$$.400 < \frac{R_{12}}{F_2} < +1.000$$

$$1.000 < \frac{R_{13}}{F_2} < +6.000$$

$$.250 < \frac{R_{14}}{F_2} < +.700$$

$$-.800 < \frac{R_{15}}{F_2} < -.300$$

$$+.600 < \frac{R_{16}}{F_2} < +5.000$$

$$-1.000 < \frac{R_{17}}{F_2} < -.500$$

$$.700 < \frac{R_{18}}{F_2} < 1.500$$

$$+.600 < \frac{R_{20}}{F_2} < +1.400$$

$$-10.000 < \frac{R_{21}}{F_2} < -1.500$$

$$-10.000 < \frac{R_{22}}{F_2} < -1.500$$

$$-.33 < \frac{F_2}{R_{19}} < +.33$$

$$-.400 < \frac{F_2}{R_{23}} < +.500$$

A preferred example of the embodiment shown in FIG. 1 is constructed in substantial compliance with the following table in which dimensions are in terms of inches, and $n_d$ designates the indices of refraction for the sodium D line and V the Abbe dispersion numbers:

Equivalent focal length=.150
Back focal length=.4199 (of objective)
Back focal length of component 1=—2.0836
$F_1$=—1.0340
Field of view=142 degrees

[f/1.0]

|  | | | | |
|---|---|---|---|---|
| $L_1$ | $R_1$=+7.500<br>$R_2$=+1.099 | $t_1$=.2583 | $n_d$=1.517 | V=64.5 |
| $L_2$ | $R_3$=—2.520<br>$R_4$=+1.527 | $s_1$=1.0332<br>$t_2$=.2066<br>$s_2$=.0413 | $n_d$=1.620 | V=60.0 |
| $L_3$ | $R_5$=+1.664<br>$R_6$=—1.600 | $t_3$=.8394 | $n_d$=1.649 | V=33.9 |
| $L_4$ | $R_7$=+4.803 | $t_4$=.2066<br>$s_3$=4.9564 | $n_d$=1.620 | V=60.0 |
| $L_5$ | $R_8$=+3.650<br>$R_9$=—7.212 | $t_5$=.1291<br>$s_4$=.0052 | $n_d$=1.670 | V=47.4 |
| $L_6$ | $R_{10}$=+.950<br>$R_{11}$=+1.574 | $t_6$=.1291<br>$s_5$=.0052 | $n_d$=1.673 | V=32.2 |
| $L_7$ | $R_{12}$=+.630 | $t_7$=.2325 | $n_d$=1.697 | V=56.2 |
| $L_8$ | $R_{13}$=+2.601<br>$R_{14}$=+.4085 | $t_8$=.0517<br>$s_6$=.3168 | $n_d$=1.720 | V=29.2 |
| $L_9$ | $R_{15}$=—.5564<br>$R_{16}$=+1.266 | $t_9$=.0517 | $n_d$=1.720 | V=29.2 |
| $L_{10}$ | $R_{17}$=—.720 | $t_{10}$=.2686<br>$s_7$=.0052 | $n_d$=1.620 | V=60.0 |
| $L_{11}$ | $R_{18}$=+1.099<br>$R_{19}$=—66.303 | $t_{11}$=.1756<br>$s_8$=.0052 | $n_d$=1.697 | V=56.2 |
| $L_{12}$ | $R_{20}$=+.950<br>$R_{21}$=—2.380 | $t_{12}$=.2273<br>$s_9$=.0517 | $n_d$=1.700 | V=47.8 |
| $L_{13}$ | $R_{22}$=—2.380<br>$R_{23}$=+8.0685 | $t_{13}$=.0800 | $n_d$=1.670 | V=47.4 |

The above described objective has highly corrected, extremely wide fields of view, and have substantially no aberrations except, of course, distortion, and when the objective is used in cameras and then a projector objective having similar distortion is used to project the images, the distortion is eliminated.

While the invention is thus described, it is not wished to be limited to the precise details described, as changes may be readily made without departing from the spirit of the invention.

What is claimed is:

1. In a wide angle lens system, a negative meniscus front component, a negative second component spaced closely behind the first component, the first and second components being positioned so as to form a biconvex air lens therebetween, a positive meniscus cemented doublet third component spaced closely behind the second component, and a positive lens group positioned a substantial distance behind the third component, and further characterized in that the lens system is constructed in substantial compliance with the following inequalities in which proceeding from front to rear $R_1$ to $R_7$ designates the radii of curvature of the surfaces of the first, second and third components, $R_8$ the front surface of the positive lens group, $t_1$ to $t_4$ the axial thicknesses of the first four lenses, $s_1$ to $s_4$ the axial separations and $F_1$ the equivalent focal length of the first, second and third components:

$$\infty < \frac{R_1}{F_1} < -3.000$$

$$-3.000 < \frac{R_2}{F_1} < -.400$$

$$\infty < \frac{R_3}{F_1} < +.400$$

$$-5.000 < \frac{R_4}{F_1} < -.5000$$

$$-6.000 < \frac{R_5}{F_1} < -.400$$

$$+.500 < \frac{R_6}{F_1} < +3.000$$

$$-.050 < -\frac{t_1}{F_1} < -1.000$$

$$.200 < -\frac{s_1}{F_1} < 4.000$$

$$.040 < -\frac{t_2}{F_1} < 1.000$$

$$0 < -\frac{s_2}{F_1} < .200$$

$$.200 < -\frac{t_3}{F_1} < 2.000$$

$$0 < \frac{s_3}{F_1} < .200$$

$$.040 < -\frac{t_4}{F_1} < .500$$

$$.500 < -\frac{s_4}{F_1} < 25.000$$

2. In a wide angle lens system, a front lens group including a negative meniscus front component, and a second negative component spaced closely behind the first component, the first and second components being positioned so as to form a biconvex air lens therebetween, the front lens group also having a positive meniscus doublet rear component, and a positive lens group positioned a substantial distance behind the second component, and further characterized in that the front lens group is constructed in substantial compliance with the following table in which dimensions are in terms of inches and proceeding from front to rear $L_1$ to $L_4$ designate the lenses, $R_1$ to $R_7$ the radii of curvature of the surfaces, $t_1$ to $t_4$ the axial thicknesses, $s_1$ to $s_3$ the axial separations and $n_d$ the indices of refraction for the sodium D line and V the Abbe dispersion numbers:

|  |  |  |  |  |
|---|---|---|---|---|
| $L_1$ | $R_1 = +7.500$ | $t_1 = .2583$ | $n_d = 1.517$ | $V = 64.5$ |
|  | $R_2 = +1.099$ | $s_1 = 1.0332$ |  |  |
| $L_2$ | $R_3 = -2.520$ | $t_2 = .2066$ | $n_d = 1.620$ | $V = 60.0$ |
|  | $R_4 = +1.527$ | $s_2 = .0413$ |  |  |
| $L_3$ | $R_5 = +1.664$ | $t_3 = .8394$ | $n_d = 1.649$ | $V = 33.9$ |
|  | $R_6 = -1.600$ | $t_4 = .2066$ | $n_d = 1.620$ | $V = 60.0$ |
| $L_4$ | $R_7 = +4.803$ | $s_3 = 4.9564$ |  |  |

3. In an extreme wide angle objective; proceeding from front to rear; a front negative lens group including a front negative meniscus singlet component and also having a second biconcave singlet and a rear positive meniscus doublet concave to the rear; and a rear positive lens group having an intermediate stop and generally symmetrical relative to the stop; the rear lens group including a front portion positioned in front of the stop and having a front biconvex singlet; the front portion also having a second positive meniscus singlet concave to the stop and a rear negative meniscus doublet concave to the stop; the rear lens group also including a rear portion positioned behind the stop and having a front negative meniscus doublet concave to the stop and a second biconvex singlet therebehind and predominantly convex to the stop; the rear portion also having a third biconvex singlet predominantly convex to the stop and a rear biconcave singlet predominantly concave to the stop; the rear surface of the third biconvex singlet and the front surface of the rear biconcave singlet being spaced from one another to form an air lens; and being further characterized in that the objective complies substantially with the following inequalities in which proceeding from front to rear $L_1$ to $L_{13}$ designate the respective lenses, $R_1$ to $R_{23}$ the radii of curvature of the surfaces, $t_1$ to $t_{13}$ the axial thicknesses, $s_1$ to $s_9$ the axial separations, $F_1$ and $F_2$ the equivalent focal lengths of the front and rear lens groups:

$$\infty < \frac{R_1}{F_1} < -3.000$$

$$-3.000 < \frac{R_2}{F_1} < -.400$$

$$\infty < \frac{R_3}{F_1} < +.400$$

$$-5.000 < \frac{R_4}{F_1} < -.5000$$

$$-6.000 < \frac{R_5}{F_1} < -.400$$

$$+.500 < \frac{R_6}{F_1} < +3.000$$

$$-1.000 < \frac{F_1}{R_7} < +.5000$$

$$-.050 < -\frac{t_1}{F_1} < -1.000$$

$$.200 < \frac{s_1}{F_1} < 4.000$$

$$.040 < -\frac{t_2}{F_1} < 1.000$$

$$0 < -\frac{s_2}{F_1} < .200$$

$$.200 < -\frac{t_3}{F_1} < 2.000$$

$$0 < \frac{s_3}{F_1} < .200$$

$$.040 < -\frac{t_4}{F_1} < .500$$

$$.500 < -\frac{s_4}{F_1} < 25.000$$

$$+ 2.000 < \frac{R_8}{F_2} < +\infty$$

$$\infty < \frac{R_9}{F_2} < - 4.000$$

$$.700 < \frac{R_{10}}{F_2} < + 2.000$$

$$.900 < \frac{R_{11}}{F_2} < + 3.000$$

$$.400 < \frac{R_{12}}{F_2} < + 1.000$$

$$1.000 < \frac{R_{13}}{F_2} < + 6.000$$

$$.250 < \frac{R_{14}}{F_2} < + .700$$

$$- .800 < \frac{R_{15}}{F_2} < - .300$$

$$+ .600 < \frac{R_{16}}{F_2} < + 5.000$$

$$- 1.000 < \frac{R_{17}}{F_2} < - .500$$

$$.700 < \frac{R_{18}}{F_2} < 1.500$$

$$+ .600 < \frac{R_{20}}{F_2} < + 1.400$$

$$-10.000 < \frac{R_{21}}{F_2} < - 1.500$$

$$-10.000 < \frac{R_{22}}{F_2} < - 1.500$$

$$- .33 < \frac{F_2}{R_{19}} < + .33$$

$$- .400 < \frac{F_2}{R_{23}} < + .500$$

4. In an extreme wide angle objective, proceeding from front to rear a front negative lens group including a front negative meniscus singlet component and also having a biconcave singlet, and a rear positive lens group having an intermediate stop and generally symmetrical relative to the stop, the front lens group also having a rear positive meniscus doublet concave to the rear, the rear lens group including a front portion positioned in front of the stop and having a front biconvex singlet, the front portion also having a second positive meniscus singlet concave to the stop and a rear negative meniscus doublet concave to the stop, the rear lens group also including a rear portion positioned behind the stop and having a front negative meniscus doublet concave to the stop and a second biconvex singlet therebehind and predominantly convex to the stop, the rear portion also having a third biconvex singlet predominantly convex to the stop and a rear biconcave singlet predominantly concave to the stop, the rear surface of the third biconvex singlet and the front surface of the rear biconcave singlet being spaced from one another and also being substantially parallel with one another to form an air lens, and being further characterized in that the objective complies substantially with the following table in which dimensions are in terms of inches and proceeding from front to rear $L_1$ to $L_{13}$ designate the respective lenses, $R_1$ to $R_{23}$ the radii of curvature of the surfaces, $t_1$ to $t_{13}$ the axial thicknesses, $s_1$ to $s_9$ the axial separations, and $n_d$ the indices of refraction for the sodium D line and V the Abbe dispersion numbers:

| Lens | R | t, s | $n_d$ | V |
|---|---|---|---|---|
| $L_1$ | $R_1=+7.500$ | $t_1=.2583$ | $n_d=1.517$ | $V=64.5$ |
|  | $R_2=+1.099$ | $s_1=1.0332$ |  |  |
| $L_2$ | $R_3=-2.520$ | $t_2=.2066$ | $n_d=1.620$ | $V=60.0$ |
|  | $R_4=+1.527$ | $s_2=.0413$ |  |  |
| $L_3$ | $R_5=+1.664$ | $t_3=.8394$ | $n_d=1.649$ | $V=33.9$ |
| $L_4$ | $R_6=-1.600$ | $t_4=.2066$ | $n_d=1.620$ | $V=60.0$ |
|  | $R_7=+4.803$ | $s_3=4.9564$ |  |  |
| $L_5$ | $R_8=+3.650$ | $t_5=.1291$ | $n_d=1.670$ | $V=47.4$ |
|  | $R_9=-7.212$ | $s_4=.0052$ |  |  |
| $L_6$ | $R_{10}=+.950$ | $t_6=.1291$ | $n_d=1.673$ | $V=32.2$ |
|  | $R_{11}=+1.574$ | $s_5=.0052$ |  |  |
| $L_7$ | $R_{12}=+.630$ | $t_7=.2325$ | $n_d=1.697$ | $V=56.2$ |
| $L_8$ | $R_{13}=+2.601$ | $t_8=.0517$ | $n_d=1.720$ | $V=29.2$ |
|  | $R_{14}=+.4085$ | $s_6=.3168$ |  |  |
| $L_9$ | $R_{15}=-.5564$ | $t_9=.0517$ | $n_d=1.720$ | $V=29.2$ |
| $L_{10}$ | $R_{16}=-1.266$ | $t_{10}=.2686$ | $n_d=1.620$ | $V=60.0$ |
|  | $R_{17}=-.720$ | $s_7=.0052$ |  |  |
| $L_{11}$ | $R_{18}=+1.099$ | $t_{11}=.1756$ | $n_d=1.697$ | $V=56.2$ |
|  | $R_{19}=-66.303$ | $s_8=.0052$ |  |  |
| $L_{12}$ | $R_{20}=+.950$ | $t_{12}=.2273$ | $n_d=1.700$ | $V=47.8$ |
|  | $R_{21}=-2.380$ | $s_9=.0517$ |  |  |
| $L_{13}$ | $R_{22}=-2.380$ | $t_{13}=.0800$ | $n_d=1.670$ | $V=47.4$ |
|  | $R_{23}=+8.0685$ |  |  |  |

References Cited in the file of this patent

UNITED STATES PATENTS

| | | |
|---|---|---|
| 1,578,259 | Boegehold | Mar. 30, 1926 |
| 2,481,639 | Altman et al. | Sept. 13, 1949 |
| 2,590,917 | Back et al. | Apr. 1, 1952 |
| 2,785,603 | Cook | Mar. 19, 1957 |
| 2,786,388 | O'Brien et al. | Mar. 26, 1957 |
| 2,803,997 | Hopkins | Aug. 27, 1957 |
| 2,846,923 | Tronnier | Aug. 12, 1958 |

FOREIGN PATENTS

| | | |
|---|---|---|
| 620,538 | Germany | Oct. 23, 1935 |
| 884,478 | France | Apr. 27, 1943 |